June 25, 1940.    H. J. KAUFMAN    2,205,413
COOLING AND DEHUMIDIFYING APPARATUS
Filed Aug. 10, 1937

INVENTOR.
Hiram Joseph Kaufman

Patented June 25, 1940

2,205,413

UNITED STATES PATENT OFFICE 2,205,413

COOLING AND DEHUMIDIFYING APPARATUS

Hiram Joseph Kaufman, Detroit, Mich.

Application August 10, 1937, Serial No. 158,384

11 Claims. (Cl. 62—133)

This invention relates to a cooling and dehumidifying apparatus which uses flake, cube, or broken water ice or brine ice to remove heat and moisture from air.

The main object of the invention is to provide a portable apparatus to produce comfort conditions in occupied rooms during hot or humid weather.

Another object of the invention is to provide an apparatus which uses water ice or brine ice to produce extremely cold air for manufacturing processes.

Another object of the invention is to provide an apparatus that is self cleaning and self draining in all of its parts and that will require a minimum amount of attention.

Another object of the invention is to provide an apparatus for producing cool, dry air free from dust, pollens, and the germs and microbes attached thereto, for the treatment of asthma and hay fever patients in hospitals and homes.

A further object of the invention is to provide an apparatus which uses water ice or brine ice, in combination with chemical dehydrating apparatus to produce extremely dry air for manufacturing processes.

The common methods of using ice for cooling and dehumidifying purposes are limited to a large extent to the latent heat of the ice without proper provision for utilizing the specific heat of the melted ice, nor any control of the relative humidity of the air being cooled, which in some cases may be increased instead of decreased due to the air contacting melted ice having a temperature higher than that of the saturation temperature of the air being cooled.

My invention provides for the counter flow of the air with the ice and melted ice so that the entering air first contacts the waste ice water indirectly, then a portion of the air contacts the melted ice directly and indirectly, while another portion of the air contacts the solid ice indirectly. The first portion of the air can be subdivided into two portions, one of which contacts the solid ice directly and the other which contacts the solid ice indirectly. These portions of the air streams are regulated separately to control humidity and are mixed before being discharged into the room.

Dehumidification is accomplished by contacting the air with surfaces having a temperature lower than that of the saturation temperature of the air, while cooling is accomplished by contacting the air with surfaces having a temperature lower than that of the air. The specific heat of a pound of air at constant pressure is approximately 0.24 B. t. u., while the latent heat of a pound of water vapor in the air is approximately 1050 B. t. u., it is therefore, necessary to produce comfort conditions with the minimum of dehumidification and the maximum of cooling in order to attain economical operation. The latent heat of water ice is 144 B. t. u. per pound and the specific heat of melted ice is approximately 1.0 B. t. u. per pound. If the melted ice is increased in temperature from 32 degrees to 80 degrees, due to absorbing heat from the room air, assuming the temperature of the room to be 80 degrees, then the melted ice will absorb 48 B t. u. per pound, or one third of that due to the melting of the ice, without absorption of heat by the melted ice water. The degree of economy is indicated by the relation of the temperature of the waste ice water to the temperature of the room being treated.

Germs and microbes are believed to be attached to particles of dust and by passing the air in contact with wet surfaces of metal, perforated metal, and rough surfaces of ice that are continuously washed by the water from the melting ice, these particles of dust and pollens and their adherent germs and microbes will be washed downward through the apparatus and out through the drain at the lowest point in the apparatus, also certain colloids, fats, cooking oils from kitchens, particles of soap from laundries, etc. will be congealed on the cold water and ice surfaces and carried away by the ice water. The advantages of this apparatus over refrigerated coils at freezing temperatures is due to the melting of the ice surfaces and the washing away of the impurities, whereas in the case of refrigerated coils the ice keeps on forming instead of melting.

Ice sublimes and forms a scum that has a tendency to clog the apparatus. The impurities absorbed from the air also have a similar tendency. This apparatus is self cleaning and self draining in all of its parts and all dust and impurities absorbed from the air and all scum formed by the sublimation of the ice will be washed downward and through the various parts and over the various members, without any obstructions, and out through the drain at the bottom of the apparatus.

This application is a division, in part, of my former application, Serial No. 112,232, filed November 23, 1936.

In the drawing:

Figures 1, 2, 3, and 4, are plan views taken at the points indicated by the corresponding numbers on Figure 5.

Figure 1:
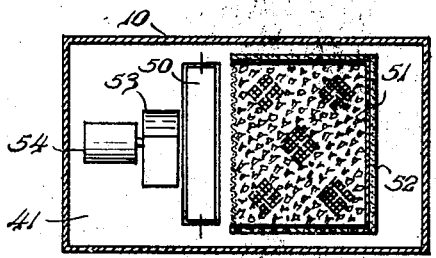
Figure 2:
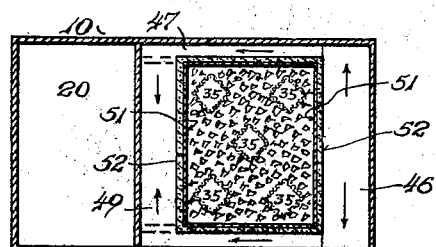
Figure 3:
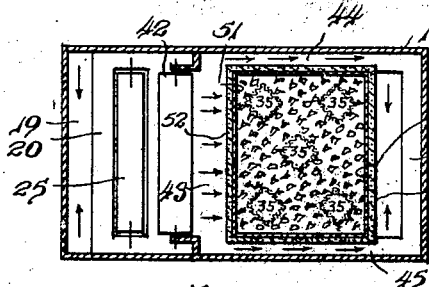
Figure 4:
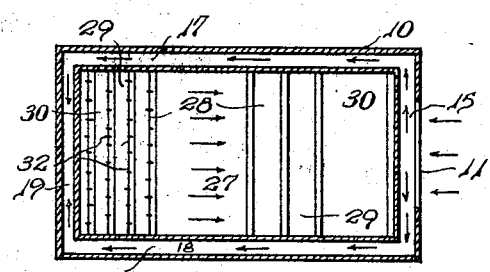
Figure 5:
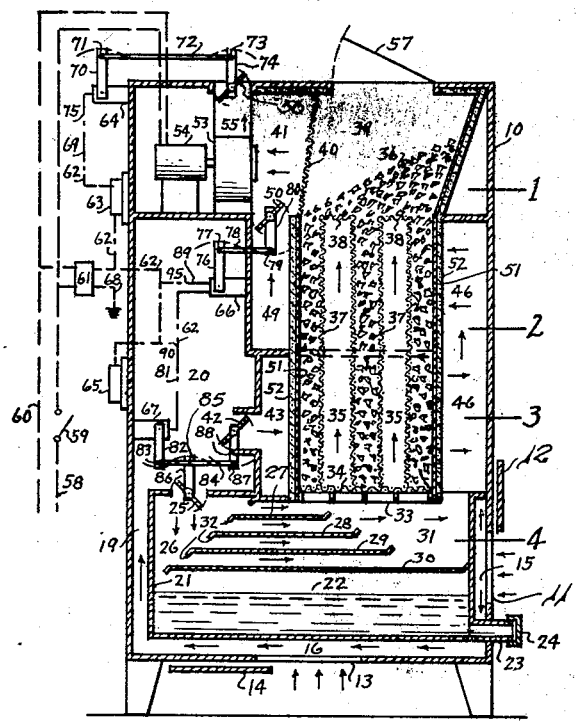
Figure 5 is a longitudinal section of the apparatus showing the means of controlling the temperature and humidity.

Referring specifically to Figure 5: the case 10 is provided with the air inlet 11 in the end, closed by the damper 12, and the air inlet 13 in the bottom, closed by the damper 14, either of which may be used and through which air is drawn into the space 15 or into the space 16, from which it is drawn through the spaces 17, 18, and 19 and into the space 20, having been slightly cooled by contacting the waste water storage tank 21 containing the waste water 22. The said waste water storage tank is large enough to hold the melted ice and water vapor condensed from the air from one charge of ice and may be periodically drained through the pipe 23 closed by the cap 24, or by a valve for the same purpose.

A portion of the air from the said space 20 is drawn past the damper 25 into the space 26, then over and between the solid racks 27, 28, 29, and 30, in a counter flow direction to that of the melted ice on the said solid racks, and into the space 31. Each solid rack catches its portion of the melted ice dripping from the solid ice above, which drains from the notched drip edges 32, of the solid racks 27, 28, and 29, in a series of small streams, alternately positioned in the air stream to break up the surface tension of the melted ice and to increase the amount of cooling surface. An alternate arrangement is to bend up the front edges of the solid racks at an angle and provide numerous drainage holes near the point of bending. The air is cooled and a small amount of moisture is removed by condensation due to direct contact with the melted ice flowing on top of the said solid racks and by indirect contact through the solid racks.

A portion of the air is drawn from the space 31 upward through the open rack 33 supporting the screen 34, upward through the air passages 35 in direct contact with the solid ice particles 36 by means of openings in the side walls 37 and the tops 38 which are formed of wire cloth or perforated metal, then through the filling hopper space 39, the screen 40, and into the fan space 41. The major part of the dehumidification is accomplished in this step by cooling the proper amount of air to within a few degrees of the temperature of the melting ice to remove the required amount of moisture, the air having been previously cooled in two steps and dehumidified in one step.

The other portion of the air is drawn from the space 20 past the damper 42 into the space 43, through the spaces 44, 45, and 46.

The other portion of the air is drawn from the space 31 into the space 46 where it is mixed with the air from the space 20, and this mixture is drawn through the spaces 47 and 48 into the space 49, then past the damper 50 into the space 41, where it is mixed with the other portion of air from the space 31. The air in the spaces 43, 44, 45, 46, 47, 48, and 49 is separated from the solid ice 36 by means of the ice container 51 which is covered by the insulating member 52 on all sides except where the air enters and leaves the ice container 51. The purpose of this covering of insulation is to keep the solid ice from cooling the surface of the insulation in contact with the air below the temperature at which condensation appears, to maintain cooling conditions without dehumidification conditions in this zone and to conserve ice by separating cooling from dehumidifying. The thickness and kind of insulation should be sufficient so that with the minimum amount of air drawn through this space the air will not be cooled below 60 or 65 degrees thempperature when the room conditions are 80 degrees temperature and 50 per cent relative humidity, or for other air conditions having the same saturation or dew point temperature, of 60 degrees.

The air will be drawn through the apparatus in the path of the least static resistance and without dampers this would be through the spaces 20, 43, 44, 45, 46, 47, 48, 49, and 41. The path of next resistance would be through the spaces 20, 26, 31, 46, 47, 49, 49, and 41. The path of the greatest resistance would be through the spaces 20, 26, 31, the screen 34, the air passages 35, with the rough sides 37, the screens 38, the pieces of ice 36, the screen 40, and the spaces 41. The air flow can be divided between the first two routes by means of the dampers 25 and 42, which work oppositely to each other. The air flow from the space 31 can be divided between the last two routes by means of the damper 50, which when open allows substantially all of the air to pass through the second route due to the greater resistance of the screens 34, 38, and 40, the resistance of the rough surfaces 37, of the air passages 35, and the resistance of the pieces of ice 36. When the damper 50 is closed all of the air from the space 31 is forced or drawn through the screen 34, the air passages 35, the screens 38, between the pieces of ice 36 and the screen 40, and into the space 41.

The air is drawn from the space 41 by the fan 53, driven by the motor 54, through the duct 55 past the damper 56 into the room, and from which it is recirculated through the cooling and dehumidifying apparatus.

The container 51 is filled with flake, cube, or broken ice through the hopper 39 by opening the filling door 57. The melted ice flows down between the ice particles and down the perforated sides 37 of the air passages 35, through the screen 34 and the open rack 33, into the space 31 and onto the solid racks 27, 28, 29, and 30, in a direction opposite to that of the air flow.

Electric power is supplied by the positive wire 58, controlled by the switch 59, and the negative wire 60 to operate the motor 54 and to supply the transformer 61, from which low voltage current is supplied by the positive wire 62 to the thermostat 63, the damper motor 64, the humidostat 65, the damper motor 66, and the damper motor 67. The negative wire 68 is shown grounded.

On a rising room temperature, the thermostatic element in the thermostat 63 completes a circuit by means of the positive wire 62 and the negative wire 69 to cause the damper motor 64 to move the lever 70 having the pivot 71 to move the rod 72 operating on the pivot 73 attached to the lever 74 to open the damper 56 to allow an increased volume of air to be drawn through the apparatus.

On a lowering temperature, the said thermostatic element completes a circuit by means of the positive wire 62 and the negative wire 75 to cause the said damper motor 64 to operate the said levers and rod in the opposite direction to close the said damper 56 to decrease the volume of air drawn through the apparatus.

On a rising room humidity, the humidostatic element in the humidostat 65 completes a circuit by means of the positive wire 62 and the negative wire 95 to cause the damper motor 66 to move the lever 76 having the pivot 77 to move the rod 78 operating on the pivot 79 attached to the lever 80 to close the damper 50 to increase the static resistance to decrease the volume of air drawn through the spaces 43, 44, 45, 46, 47, 48, and 49, and to increase the volume of air drawn through the spaces 26, 31, 35, and 39, and after the said lever 76 has moved to a predetermined point in the arc, mechanism within the said damper motor 66 completes a circuit by means of the positive wire 62 and the negative wire 81 to cause the damper motor 67 to move the lever 82 having the pivot 83 to move the rod 84 operating on the pivot 85 attached to the lever 86 to open the damper 25 to increase the volume of air drawn through the spaces 26, 31, 35, and 39, and also the movement of the said rod 84 operating on the pivot 87 attached to the lever 88 to close the damper 42 to decrease the volume of air drawn through the spaces 43, 44, 45, 46, 47, 48, and 49.

On a lowering humidity, the said humidostatic element in the humidostat 65 completes a circuit by means of the positive wire 62 and the negative wire 89 to cause the said damper motor 66 to operate the said levers and rod in the opposite direction to open the said damper 50 to decrease the static resistance to increase the volume of air drawn through the said spaces 43, 44, 45, 46, 47, 48, and 49, and to decrease the volume of air drawn through the said spaces 26, 31, 35, and 39, and after the said lever 76 has moved in the opposite direction to a predetermined point in the arc, mechanism within the said damper motor 66 completes a circuit by means of the positive wire 62 and the negative wire 90 to cause the said damper motor 67 to operate the said levers and rod in the opposite direction to close the said damper 25 to decrease the volume of air drawn through the said spaces 26, 31, 35, and 39, and also to open the said damper 42 to increase the volume of air drawn through the said spaces 43, 44, 45, 46, 47, 48, and 49.

When it is desired to produce extremely cold air for manufacturing purposes, the humidostat is set at 10 per cent relative humidity and all of the air is drawn through the apparatus in contact with the solid ice and is cooled to within a few degrees of the melting point of the ice. Flake brine ice can be used with a melting point of minus six degrees Fahrenheit which allows temperatures approximating zero for the saturated air leaving the apparatus.

Figure 6:
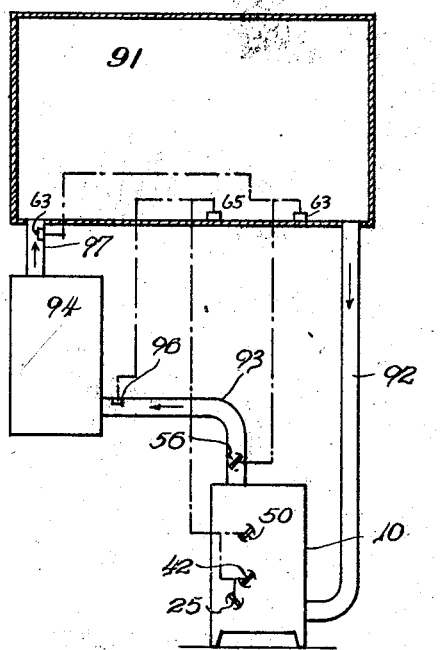
Figure 6 is a diagram of the apparatus in combination with chemical dehydrating apparatus showing the means of controlling the temperature and humidity.

Figure 6 shows a diagram of apparatus for producing extremely dry air in which air is drawn from the space being conditioned denoted as 91, through the duct 92 through the case 10, indicating the apparatus shown in Figure 5, through the duct 93, through the chemical dehydrating apparatus 94, and through the duct 97 to the said space 91. The chemical dehydrating apparatus refers to any arrangement in which the leaving air is in contact with the dry chemical and which uses a hygroscopic agent such as calcium chloride, magnesium chloride, or other chemical not altered in effect by temperatures below the freezing point of water. The wet bulb temperature and the total heat of the air remains constant in this chemical dehydrating apparatus, and the rise in the dry bulb temperature of the air is equal to the conversion of the latent heat of the moisture absorbed into sensible heat, approximately. Assuming that the air leaving the case 10 to have a temperature of 35 degrees and 100 per cent relative humidity, when water ice is used as the cooling and condensing medium, the air leaving the chemical dehydrator would have a temperature of 43 degrees and a relative humidity of 40 per cent, corresponding to a saturation temperature of 22 degrees, approximately.

Assuming that the air leaving the case 10 to have a temperature of zero and a relative humidity of 100 per cent, when brine ice is used as the cooling and condensing medium, the air leaving the chemical dehydrator would have a temperature of 2.0 degrees and a relative humidity of 50 per cent, corresponding to a saturation temperature of minus 11 degrees, approximately.

When the temperature of the space 91 is kept above freezing, the thermostat 63 and the humidostat 65 are placed within the said space 91 and control the operation of the apparatus as previously described for Figure 5, except at a lower temperature and with drier air due to the lowered dew point temperature, in terms of relative humidity.

When the temperature of the space 91 is kept below freezing, and the air is cooled below saturation temperature, the humidostat 65 is removed and a thermostat 96 is placed in the duct 93 to control the wet bulb temperature of the air, which is the same as the dry bulb temperature and dew point temperature of saturated air, and as this wet bulb temperature remains approximately constant through the chemical dehydrating apparatus, it is a measure of the wet bulb temperature of the air in the duct 97. The thermostat 63 is moved into the said duct 97 and is a measure of the dry bulb temperature of the air in the said duct 97, and the relation of the wet bulb temperature to that of the dry bulb temperature is a measure of the humidity. The action of the said thermostat 96 is the same as that for the humidostat 65, that is, with a rising temperature the same damper movements take place as with the rising humidity, and with a lowering temperature the reverse is true.

It is also possible with this arrangement to carry the room temperature higher than the temperature of the air in the duct 97 by placing a heating coil in the duct 97 after the said thermostat 63 and controlling the amount of steam supplied to the coil by a room thermostat.

It is to be understood that minor changes may be made in the invention to make it of practical use, including the substitution of compressed air at various pressures for operating the dampers in series and in the proper sequence.

What I claim is:

1. Air conditioning apparatus, comprising a container for receiving pieces of ice through an opening in the top, a perforated bottom for the drainage of melted ice and for the entrance of air, the major portion of the sides of said container being partially insulated for retarding the transmission of heat from the air surrounding the said container to the ice, a portion of the upper part of the sides being perforated for the exit of air, fixed vertical air passages extending through the major portion of the height of the said container and having perforated sides and tops for contacting the ice with the air and for draining the melted ice, means for drawing air upward through the said air passages in contact with the ice and melted ice, for removing heat, moisture, and impurities, means for drawing air around the partially insulated sides of the said ice container, for removing heat only, horizontal members placed beneath the said ice container and positioned so that each member catches its proportion of the ice water dripping from the said ice container, said horizontal members having smooth upper surfaces without obstructions for draining the ice water and impurities absorbed from the air and having the edge exposed to the ice water drippings turned up at an angle for directing the said ice water to flow in a direction opposite to that of the air, means for causing the air to flow between the said horizontal members, for removing heat, moisture, and impurities, a collecting tank positioned below the said horizontal members for collecting the waste ice water dripping from the said horizontal members and having a drain at the lowest point for draining the waste water and absorbed impurities, means for drawing air around the said collecting tank, for removing heat only, means for proportioning the air through the various routes, and means for controlling the volume of air circulated.

2. Air conditioning apparatus, comprising in combination, a container for receiving pieces of ice, means for insulating the said container from the surrounding air, members for receiving the ice water formed by the melting of the said pieces of ice, a tank for receiving the waste ice water from the said ice water receiving members, means for drawing air from an enclosure, means for flowing the air in contact with the said waste ice water tank, means for flowing a portion of the air around the said ice container, means for flowing the other portion of the air in contact with the said ice water and ice water receiving means, means for flowing a part of the latter portion of the said air flow in contact with the said pieces of ice, means for flowing the other part of the latter portion of the said air flow around the said ice container and for mixing with the said first portion of the air flow, means for combining this mixture with the other part of the said latter flow of air, means for regulating the proportions of the three flows of air, means for returning the combined flow of air to the said enclosure, and means for controlling the volume of air circulated.

3. Air conditioning apparatus, comprising, a container for receiving pieces of ice, said container having a perforated bottom for draining the melted ice and fixed vertical air passages extending through the major portion of the height of the said container, the said air passages having perforated sides and tops for contacting the ice with the air, members for receiving the ice water formed by the melting of the said pieces of ice, a tank for receiving the waste ice water from the said ice water receiving members, means for withdrawing air from an enclosure and for flowing the air first in contact with the waste ice water receiving tank, means for flowing the air next in contact with the said ice water and ice water receiving members, means for next flowing the air upwardly through the said perforated bottom and upwardly through the said air passages and contacting the air with the said pieces of ice, and means for returning the air to the said enclosure.

4. Air conditioning apparatus, comprising in combination, a container for receiving pieces of ice, means for insulating the said container from the surrounding air, members for receiving the ice water formed by the melting of the said pieces of ice, a tank for receiving the waste ice water from the said ice water receiving members, means for withdrawing air from an enclosure and for flowing the air in contact with the said waste ice water receiving tank, means for flowing a portion of the air around the said ice container, means for flowing the other portion of the air in contact with the said ice water and the said ice water receiving members and through and around the said ice container, means for combining the two portions of air, means for regulating the proportions of the two portions of air, means for returning the combined flow of air to the said enclosure, and means for controlling the volume of air circulated.

5. Air conditioning apparatus, comprising in combination, a container for receiving pieces of ice, means for insulating the said container from the surrounding air, members for receiving the ice water formed by the melting of the said pieces of ice, a tank for receiving the waste ice water from the said ice water receiving members, means for withdrawing air from an enclosure and for flowing the air in contact with the said waste ice water receiving tank, means for flowing the air in contact with the said ice water and ice water receiving members, means for contacting a portion of the air flow with the said pieces of ice, means for contacting the other portion of the air flow with the said insulated ice container, means for varying the proportions of the two air flows, means for mixing the two flows of air, means for returning the combined air flow to the said enclosure, and means for controlling the volume of air circulated.

6. Air conditioning apparatus, comprising, a container for receiving pieces of ice, having a perforated bottom for draining the melted ice, means for partially insulating the said container from the surrounding air, members for receiving the ice water formed by the melting of the said pieces of ice, a tank for receiving the waste ice water from the said ice water receiving members, means for withdrawing air from an enclosure and for flowing the air first in contact with the said waste ice water tank and next around the partially insulated sides of the said ice container, and means for returning the air to the said enclosure.

7. Air conditioning apparatus, comprising an ice container having an opening in the top for filling with pieces of ice, the bottom perforated for the drainage of ice water and for the entrance of air, the upper part perforated for the exit of air, the major portion of the sides thermally insulated for retarding the transmission of heat, and air passages extending vertically through the major portion of the said ice container, having the sides and tops perforated to secure direct contact between the air and the pieces of ice, horizontal solid racks placed beneath the said ice container, horizontally positioned so that each rack catches its proportion of the ice water dripping from the said ice container, said solid racks having turned up edges exposed to the said water drippings and the opposite edges turned down so as to cause the ice water to flow across the surface of the said solid racks in direct and in indirect contact with the air and to drip from the turned down edges, from one rack to another, in a series of small streams due to notches formed at intervals in the said turned down edges so as to break up the surface tension of the ice water, a receptacle placed beneath the said solid racks for catching the waste ice water dripping from the lowest solid rack, means for drawing air from an enclosure in and around the bottom and sides of the waste ice water receptacle, over and between the solid racks in a direction opposite to the flow of the ice water, means for drawing the air through either of two routes and means for regulating the ratios of the two flows, either through the perforated bottom and up through the air passages of the ice container and through the perforated portion of the upper part of the ice container, or around the thermally insulated sides of the ice container, and means for returning the combined flow of air to the said enclosure.

8. Air conditioning apparatus, comprising an ice container having an opening in the top for filling with pieces of ice, the bottom perforated for the drainage of ice water and for the entrance of air, the upper part perforated for the exit of air, the major portion of the sides thermally insulated for retarding the transmission of heat, and air passages extending vertically through the major portion of the said ice container, having the sides and tops perforated to secure direct contact between the air and the pieces of ice, horizontal solid racks placed beneath the said ice container, horizontally positioned so that each rack catches its proportion of the ice water dripping from the said ice container, said solid racks having turned up edges exposed to the said ice water drippings and the opposite edges turned down so as to cause the ice water to flow across the surface of the said solid racks in direct and in indirect contact with the air and to drip from the turned down edges, from one rack to another, in a series of small streams due to notches formed at intervals in the said turned down edges so as to break up the surface tension of the ice water, a receptacle placed beneath the said solid racks for catching the waste ice water dripping from the lowest solid rack, means for drawing air from an enclosure in and around the bottom and sides of the waste ice water receptacle and through either of two routes and means for regulating the ratios of the two flows, either over and between the solid racks and around the thermally insulated sides of the ice container, or around the thermally insulated sides of the ice container, and means for returning the combined flow of air to the said enclosure.

9. Air conditioning apparatus, comprising an ice container having an opening in the top for filling with pieces of ice, the bottom perforated for the drainage of ice water and for the entrance of air, the upper part perforated for the exit of air, the major portion of the sides thermally insulated for retarding the transmission of heat, and air passages extending vertically through the major portion of the said ice container, having the sides and tops perforated to secure direct contact between the air and the pieces of ice, horizontal solid racks placed beneath the said ice container, horizontally positioned so that each rack catches its proportion of the ice water dripping from the said ice container, said solid racks having turned up edges exposed to the said ice water drippings and the opposite edges turned down so as to cause the ice water to flow across the surface of the said solid racks in direct and in indirect contact with the air and to drip from the turned down edges, from one rack to another, in a series of small streams due to notches formed at intervals in the said turned down edges so as to break up the surface tension of the ice water, a receptacle placed beneath the said solid racks for catching the waste ice water dripping from the lowest solid rack, means for drawing air from an enclosure in and around the bottom and sides of the waste ice water receptacle, over and between the solid racks in a direction opposite to the flow of the ice water, through the perforated bottom and up through the air passages of the ice container in a direction opposite to the flow of the ice water, through the perforated portion of the upper part of the ice container, and means for returning the air to the said enclosure.

10. Air conditioning apparatus, comprising an ice container having an opening in the top for filling with pieces of ice, the bottom perforated for the drainage of ice water and for the entrance of air, the upper part perforated for the exit of air, the major portion of the sides thermally insulated for retarding the transmission of heat, and air passages extending vertically through the major portion of the said ice container, having the sides and tops perforated to secure direct contact between the air and the pieces of ice, horizontal solid racks placed beneath the said ice container, horizontally positioned so that each rack catches its proportion of the ice water dripping from the said ice container, said solid racks having turned up edges exposed to the said ice water drippings and the opposite edges turned down so as to cause the ice water to flow across the surface of the solid racks in direct and in indirect contact with the air and to drip from the turned down edges, from one rack to another, in a series of small streams due to notches formed at intervals in the said turned down edges so as to break up the surface tension of the ice water, a receptacle placed beneath the said solid racks for catching the waste ice water dripping from the lowest solid rack, means for drawing air from an enclosure in and around the bottom and sides of the waste ice water receptacle, means for drawing the air through all of three routes and means for regulating the ratios of the three flows, either around the thermally insulated sides of the ice container, or over and between the solid racks in a direction opposite to the flow of the ice water, up through the perforated bottom of the ice container, up through the air passages of the ice container, and through the perforated portion of the upper part of the ice container, or over and between the solid racks in a direction opposite to the flow of the ice water and around the thermally insulated sides of the ice container, and means for returning the combined flow of air to the said enclosure.

11. Air conditioning apparatus, comprising an ice container having an opening in the top for filling with pieces of ice, the bottom perforated for the drainage of ice water and for the entrance of air, the upper part perforated for the exit of air, the major portion of the sides thermally insulated for retarding the transmission of heat, and air passages extending vertically through the major portion of the said ice container, having the sides and tops perforated to secure direct contact between the air and the pieces of ice, horizontal solid racks placed beneath the said ice container, horizontally positioned so that each rack catches its proportion of the ice water dripping from the said ice container, said solid racks having turned up edges exposed to the said ice water drippings and the opposite edges turned down so as to cause the ice water to flow across the surface of the said solid racks in direct and in indirect contact with the air and to drip from the turned down edges, from one rack to another, in a series of small streams due to notches formed at intervals in the said turned down edges so as to break up the surface tension of the ice water, a receptacle placed beneath the said solid racks for catching the waste ice water dripping from the lowest solid rack, means for drawing air from an enclosure in and around the bottom and sides of the waste ice water receptacle and around the thermally insulated sides of the ice container, and means for returning the flow of air to the said enclosure.

HIRAM JOSEPH KAUFMAN.